United States Patent
Bauman et al.

(10) Patent No.: US 8,370,020 B2
(45) Date of Patent: Feb. 5, 2013

(54) METHOD AND SYSTEM FOR COMMUNICATING VEHICLE DIAGNOSTIC DATA TO INTERNET SERVER VIA BLUETOOTH ENABLED CELL PHONE FOR SUBSEQUENT RETRIEVAL

(75) Inventors: Jason G. Bauman, Huntington Woods, MI (US); Jody K. Harwood, Plymouth, MI (US); Kenan R. Rudnick, Bloomfield Hills, MI (US); Clayton Mackey, Clarkston, MI (US)

(73) Assignee: Lear Corporation, Southfield, MI (US)

( * ) Notice: Subject to any disclaimer, the term of this patent is extended or adjusted under 35 U.S.C. 154(b) by 1299 days.

(21) Appl. No.: 11/767,036

(22) Filed: Jun. 22, 2007

(65) Prior Publication Data

US 2008/0316006 A1 Dec. 25, 2008

(51) Int. Cl.
*G01M 17/00* (2006.01)
*B60R 25/10* (2006.01)
(52) U.S. Cl. .................. 701/33.2; 340/426.15
(58) Field of Classification Search ............... 701/29, 701/30, 33, 34, 43, 101; 340/825.54, 825.52, 340/426, 438, 425.5
See application file for complete search history.

(56) References Cited

U.S. PATENT DOCUMENTS

| | | | |
|---|---|---|---|
| 6,028,537 A | 2/2000 | Suman et al. | |
| 6,807,469 B2 | 10/2004 | Funkhouser et al. | |
| 6,853,894 B1* | 2/2005 | Kolls | 701/31.4 |
| 6,853,910 B1 | 2/2005 | Oesterling et al. | |
| 7,113,127 B1* | 9/2006 | Banet et al. | 342/357.31 |
| 7,142,959 B2 | 11/2006 | Oesterling et al. | |
| 7,893,818 B2* | 2/2011 | Smoyer et al. | 340/426.12 |
| 2002/0044049 A1 | 4/2002 | Saito et al. | |
| 2004/0203379 A1 | 10/2004 | Witkowski et al. | |
| 2004/0227523 A1 | 11/2004 | Namaky | |
| 2005/0192727 A1* | 9/2005 | Shostak et al. | 701/37 |
| 2006/0212193 A1* | 9/2006 | Breed | 701/29 |
| 2006/0212194 A1 | 9/2006 | Breed | |
| 2007/0005201 A1* | 1/2007 | Chenn | 701/29 |
| 2007/0005202 A1 | 1/2007 | Breed | |

FOREIGN PATENT DOCUMENTS

| | | |
|---|---|---|
| DE | 10254284 A1 | 1/2004 |
| DE | 102005003112 A1 | 9/2005 |
| DE | 102004035427 A1 | 3/2006 |
| DE | 60121888 T2 | 3/2007 |
| DE | 102006031726 A1 | 4/2007 |

OTHER PUBLICATIONS

German Patent Office, German Office Action for the corresponding German patent application No. 10 2008 022 771.4 mailed Sep. 25, 2009.

* cited by examiner

*Primary Examiner* — James Trammell
*Assistant Examiner* — Muhammad Shafi
(74) *Attorney, Agent, or Firm* — Brooks Kushman P.C.

(57) ABSTRACT

A method and system for communicating vehicle diagnostic data to a vehicle service provider employs sensors for generating sensor signals indicative of the status or condition of vehicle components. A diagnostics module in the vehicle generates diagnostic data based on the sensor signals and transfers the diagnostic data to a communications module of a hands-free phone system in the vehicle. The communications module wirelessly communicates the diagnostic data to a Bluetooth enabled cell phone in the vehicle using Bluetooth communications. The cell phone communicates the diagnostic data to an Internet server via the Internet. The provider accesses the diagnostic data from the Internet server using a computer connected to the Internet to determine if any of the vehicle components are in need of repair or maintenance. The provider notifies a user of the vehicle of any vehicle component that is in need of repair or maintenance.

20 Claims, 2 Drawing Sheets

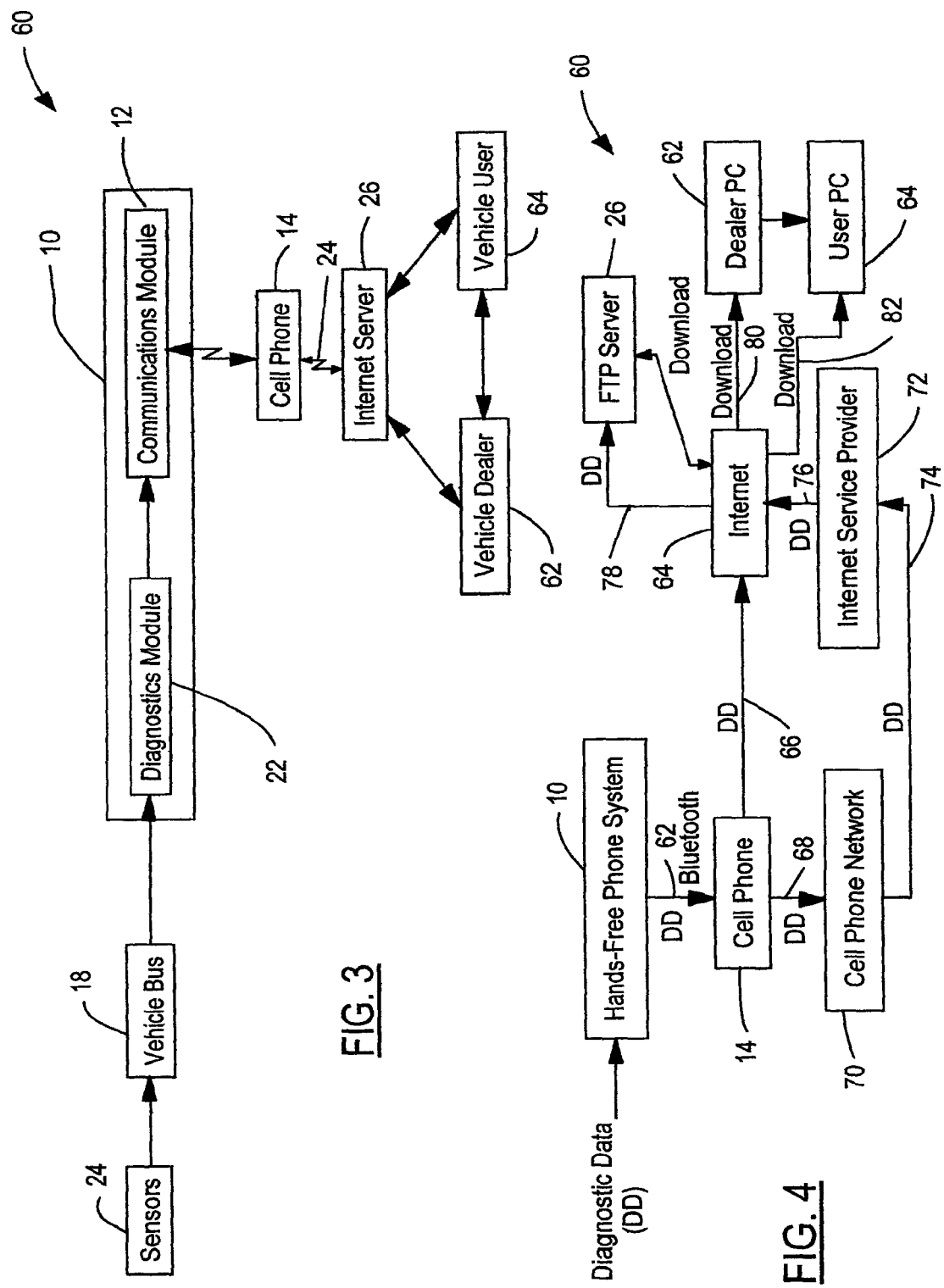

METHOD AND SYSTEM FOR COMMUNICATING VEHICLE DIAGNOSTIC DATA TO INTERNET SERVER VIA BLUETOOTH ENABLED CELL PHONE FOR SUBSEQUENT RETRIEVAL

BACKGROUND OF THE INVENTION

1. Field of the Invention

The present invention relates to communicating vehicle diagnostic data from a vehicle to a vehicle service provider.

2. Background Art

A vehicle includes sensors for monitoring the operational status of components of the vehicle. For instance, a vehicle may include tire sensors for monitoring the tires; a battery sensor for monitoring the battery; an oil sensor for monitoring the engine oil; etc. Each sensor generates a sensor signal indicative of the condition or status of the monitored component. Many of the sensor signals are communicated to other elements of the vehicle such as a controller. In general, the sensor signals represent diagnostic data of the vehicle. The controller determines warning conditions based on the diagnostic data and generates warning signals for a user of the vehicle when warning conditions (i.e., low tire pressure, low battery level, low engine level, etc.) are reached.

The diagnostic data may be indicative of the need for routine maintenance in addition to being indicative of warning conditions. For instance, routine maintenance of a vehicle may call for the tires to be rotated and the windshield wipers to be replaced every ten thousand miles. As such, odometer data (i.e., the number of elapsed miles) is indicative of when this routine maintenance is required. Although many users are diligent in replacing engine oil and checking tire pressure, a problem is that many users are not aware of many of the other routine maintenance projects and/or their due dates. Further, most users do not keep an up-to-date checklist to ensure performance of routine maintenance. Vehicle service providers such as vehicle dealers try to solve this problem by sending reminders to users regarding routine maintenance due dates. A problem is that providers base the reminders on data which is not indicative of current vehicle operating conditions. For instance, providers base the reminders on model years of the vehicles and/or data taken by the providers when the vehicles were last brought to the providers. It would be beneficial if a provider had knowledge of current vehicle operating conditions such that the provider could determine whether any maintenance for the vehicle is required to notify the user of such requirements prior to the user taking the vehicle to the provider.

Further, the status of a given vehicle component which is operating less than optimally over a given period of time (e.g., low tire pressure) may affect the status of another component (e.g., the engine being less efficient as a result of the low tire pressure) such that routine maintenance of the other component (e.g., changing engine spark plugs) is required earlier. In this case, diagnostic data for the engine indicates that the engine is running inefficiently but does not reach a warning condition. As such, the user is unaware that the engine is running inefficiently until the engine breaks down and reaches a warning condition. The expenses for addressing the engine break down are likely to be higher than the expenses for addressing the inefficient engine operating condition. Accordingly, it is desired to correct the operating status of the engine prior to the engine breaking down. Such problems could be corrected by a provider who is aware that the engine is operating inefficiently. Unfortunately, unless the user brings the vehicle to the provider for some reason, the provider would be unaware that the engine is operating inefficiently and would not be able to fix the engine. As such, again, it would be beneficial if the provider had knowledge of the current vehicle operating conditions such that the provider could determine whether any maintenance for the vehicle is required and notify the user of such requirements prior to the user taking the vehicle to the provider.

Another problem is that the generated warning signals generally do not convey the severity of the warning conditions nor the actual problems to the user. For instance, a "check engine" warning signal does not convey the severity and/or the cause of the engine problem. In order to determine such information, the user has to physically take the vehicle to a provider. In turn, the provider physically connects a computer or the like to the vehicle to read information from the vehicle such as diagnostic trouble codes in order to determine the problem. Accordingly, in this case, the user may ignore the "check engine" warning signal and hope that this problem goes away if the vehicle appears to be otherwise running smoothly. The user may decide to take this chance as the user is not fully aware of the severity of the engine problem. As such, this may become a bigger problem to the user if the severity of the engine problem does not reveal itself to the user until the vehicle breaks down along a highway. At this point, the user will likely wish that the user had brought the vehicle to a provider in order for the provider to address the engine problem. As such, again, it would be beneficial if the provider had knowledge of the current vehicle operating conditions such that the provider could determine whether any maintenance for the vehicle is required and notify the user of such requirements prior to the maintenance becoming a bigger concern as a result of the user not initially taking the vehicle to the provider.

A hands-free phone system in a vehicle enables a user to talk on a cell phone while using both hands for driving the vehicle. Some hands-free phone systems include a Bluetooth communications module operable for wirelessly communicating with a Bluetooth enabled cell phone in the vehicle. During a call between a user using the cell phone and another party over a phone network, the communications module receives voice signals of the user via a microphone connected to the communications module. The communications module wirelessly communicates the voice signals of the user to the cell phone for transmission over the phone network for receipt by the other party. Likewise, during the call, the communications module wirelessly receives voice signals of the other party from the cell phone. The communications module outputs the voice signals of the other party through the vehicle speakers for the user to hear.

It would be desirable if a vehicle controller in possession of vehicle diagnostic data were to work in conjunction with a hands-free Bluetooth enabled phone system of the vehicle to convey the diagnostic data to a vehicle service provider such that the provider had knowledge of the current vehicle operating conditions to determine whether any maintenance for the vehicle is required and notify the user of such requirements prior to the user taking the vehicle to the provider.

SUMMARY OF THE INVENTION

Accordingly, an object of the present invention includes a method and system for communicating diagnostic data of a vehicle to an Internet server via a Bluetooth enabled cell phone for subsequent retrieval of the diagnostic data from the Internet server by a vehicle service provider and/or a user of the vehicle.

It is another object of the present invention to provide a method and system for communicating diagnostic data from a diagnostics module of a vehicle to a cell phone in the vehicle using Bluetooth communications and then communicating the diagnostic data from the cell phone to an Internet server for subsequent retrieval of the diagnostic data from the Internet server by a vehicle service provider and/or a user of the vehicle.

It is a further object of the present invention to provide a method and system for communicating diagnostic data of a vehicle, which is received from the vehicle bus by a diagnostics module of the vehicle, from the diagnostics module to a cell phone in the vehicle using Bluetooth communications and then communicating the diagnostic data from the cell phone to an Internet server for subsequent retrieval of the diagnostic data from the server by a vehicle service provider and/or a user of the vehicle.

It is another object of the present invention to provide a method and system for communicating diagnostic data of a vehicle to an Internet server for subsequent retrieval of the diagnostic data from the server by a vehicle service provider and/or a user of the vehicle in which a Bluetooth enabled module of the vehicle receives the diagnostic data from the vehicle bus and sends the diagnostic data over a Bluetooth connection to a cell phone connected to the Internet.

It is a further object of the present invention to provide a method and system for retrieving, storing, and transferring diagnostic data of a vehicle from a vehicle module to an off-board server using Bluetooth communications.

In carrying out the above objects and other objects, the present invention provides a vehicle. The vehicle includes a vehicle bus and a plurality of sensors for monitoring the operational status or condition of components of the vehicle. Each sensor generates a sensor signal indicative of the monitored vehicle component and providing the sensor signal to the vehicle bus. A diagnostics module is connected to the vehicle bus to receive the sensor signals. The diagnostics module generates diagnostic data of the vehicle based on the sensor signals. A hands-free phone system having a communications module is connected to the vehicle bus and is operable for wirelessly communicating with a Bluetooth enabled cell phone in the vehicle using Bluetooth communications. The diagnostics module transfers the diagnostic data to the communications module and the communications module wirelessly transmits the diagnostic data to the cell phone using Bluetooth communications for the cell phone to communicate to an Internet server.

Further, in carrying out the above objects and other objects, the present invention provides a system for communicating diagnostic data of a vehicle from the vehicle to a vehicle service provider. The system includes a plurality of sensors for monitoring the operational status or condition of components of the vehicle. Each sensor generates a sensor signal indicative of the monitored vehicle component. The system further includes a diagnostics module operable for receiving the sensor signals from the sensors. The diagnostics module generates diagnostic data based on the sensor signals. The system further includes a Bluetooth enabled cell phone in the vehicle. The system further includes a hands-free phone system in the vehicle. The hands-free phone system has a communications module operable for wirelessly communicating with the cell phone using Bluetooth communications. The system further includes an Internet server and a computer of a vehicle service provider having access to the Internet server via the Internet. The diagnostics module transfers the diagnostic data to the communications module. The communications module wirelessly transmits the diagnostic data to the cell phone using Bluetooth communications. The cell phone communicates the diagnostic data to the Internet server via the Internet. The computer of the vehicle service provider accesses the diagnostic data stored on the Internet server for the vehicle service provider to analyze the diagnostic data to determine if any of the vehicle components are in need of repair or maintenance.

Also, in carrying out the above objects and other objects, the present invention provides a method for communicating diagnostic data of a vehicle to a vehicle service provider. The method includes monitoring components of a vehicle using sensors, generating sensor signals indicative of the monitored vehicle components, and generating diagnostic data based on the sensor signals. The diagnostic data is transferred to a hands-free phone system of the vehicle and then wirelessly communicated from the hands-free phone system to a Bluetooth enabled cell phone in the vehicle using Bluetooth communications. The diagnostic data is then communicated over a communications line having at least one wireless segment from the cell phone to an Internet server via the Internet. A computer of a vehicle service provider accesses the diagnostic data from the Internet server. The vehicle service provider analyzes the diagnostic data to determine if any of the vehicle components are in need of repair or maintenance and then notifies a user of the vehicle of any vehicle component that is in need of repair or maintenance.

The above features, and other features and advantages of the present invention as readily apparent from the following detailed descriptions thereof when taken in connection with the accompanying drawings.

BRIEF DESCRIPTION OF THE DRAWINGS

FIG. 3 illustrates a block diagram of a system for communicating diagnostic data of a vehicle from the hands-free phone system to an Internet server via a Bluetooth enabled cell phone in the vehicle for subsequent retrieval of the diagnostic data from the Internet server by a vehicle service provider and/or a user of the vehicle in accordance with an embodiment of the present invention; and FIG. 4 illustrates a more detailed block diagram of the system shown in FIG. 3.

DETAILED DESCRIPTION OF THE PREFERRED EMBODIMENT(S)

Figure 1:
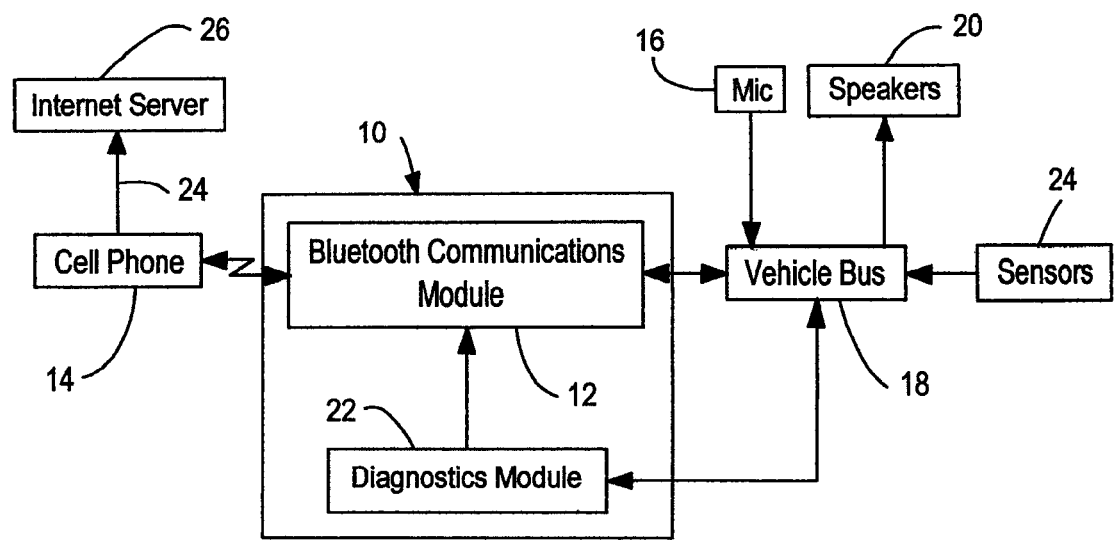
FIG. 1 illustrates a block diagram of a hands-free phone system of a vehicle in which the phone system includes a diagnostics module for receiving sensor signals regarding the operational status of components of the vehicle from sensors in the vehicle via the vehicle bus and wirelessly communicates diagnostic data based on the sensor signals using Bluetooth communications to a Bluetooth enabled cell phone in the vehicle in accordance with an embodiment of the present invention.

Referring now to FIG. 1, a block diagram of a hands-free phone system 10 of a vehicle in accordance with an embodiment of the present invention is shown. Phone system 10 enables a user of the vehicle to have a phone conversation while using both hands for driving the vehicle. To this end, phone system 10 includes a Bluetooth enabled communications module 12 which is operable for wirelessly communicating with Bluetooth enabled devices such as a Bluetooth enabled cell phone 14 in the vehicle. During a call between a user using cell phone 14 and another party over a phone network, communications module 12 receives voice signals of the user via a microphone 16 which is connected to the communications module via a bus 18 of the vehicle. Communications module 12 wirelessly communicates the voice signals of the user to cell phone 14 for transmission over the phone network for receipt by the other party. Likewise, during the call, communications module 12 wirelessly receives voice signals of the other party from cell phone 14. Communications module 12 outputs the voice signals of the other party through vehicle speakers 20 via vehicle bus 18 for the user to hear.

Phone system 10 is further operable for wirelessly communicating diagnostic data regarding components of the vehicle to cell phone 14 using Bluetooth communications. To this end, phone system 10 further includes a diagnostics module 22. Diagnostics module 22 is connected to vehicle bus 18 to receive sensor signals from sensors 24 in the vehicle. Sensors 24 monitor the operational status and condition of components of the vehicle and generate sensor signals which are indicative of the operational status and condition of the monitored vehicle components. Sensors 24 provide the sensor signals to vehicle bus 18. In turn, diagnostics module 22 receives the sensors signals from vehicle bus 18. Alternatively, some of sensors 24 may provide their sensor signals directly to diagnostics module 22 without the use of vehicle bus 18. Diagnostics module 22 may analyze the sensor signals to determine diagnostic data of the vehicle. For instance, diagnostics module 22 analyzes the sensor signals to determine whether the monitored vehicle components are operating inefficiently and/or are in need of maintenance or repair. Diagnostics module 22 provides the diagnostic data to communications module 12 either directly or via vehicle bus 18. Additionally or alternatively, diagnostics module 22 may provide the sensor signals in their raw state to communications module 12. In this case, the sensor signals provided from diagnostics module 22 to communications module 12 also represents diagnostic data of the vehicle.

Communications module 12 wirelessly communicates the diagnostic data received from diagnostics module 22 using Bluetooth communications to cell phone 14. In turn, cell phone 14 communicates the diagnostic data over a communications path 24 to an Internet server 26. Communications path 24 includes a wireless segment. A user of the vehicle or a vehicle service provider such as a vehicle dealer may access Internet server 26 to gain access to the diagnostic data. The vehicle service provider has service personnel or computer software which can analyze the diagnostic data to determine if any of the components are in need or maintenance or repair. The user may also access the diagnostic data to determine operating conditions of the vehicle such as fuel efficiency over a given time period, tire status, air conditioner status, etc. If either the provider or the user notices that a component is in need of maintenance or repair based on the diagnostic data, then the user can bring the vehicle to the provider. For instance, if the provider notices that a certain component is in need of maintenance or repair after analyzing the diagnostic data, then the provider may notify the user of same. In turn, the user can take the vehicle to the provider to address the issue.

Figure 2:
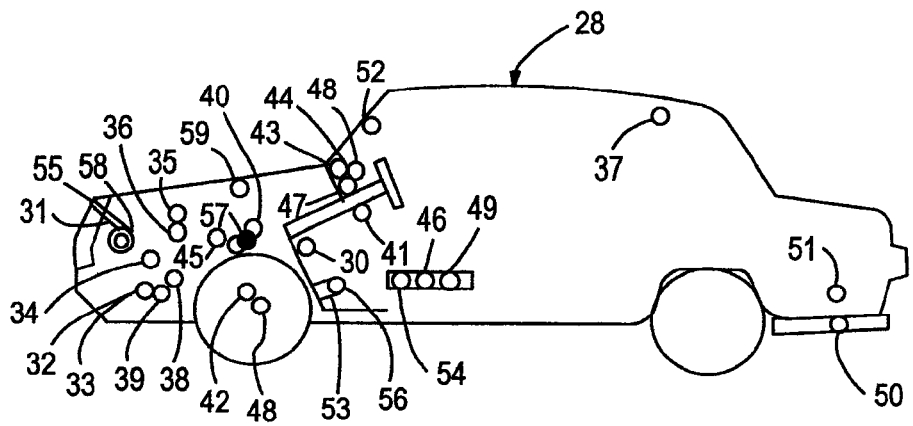
FIG. 2 illustrates a schematic of a vehicle having a plurality of sensors for providing sensor signals indicative of the operational status of monitored vehicle components to the diagnostics module of the hands-free phone system in accordance with an embodiment of the present invention.

Referring now to FIG. 2, with continual reference to FIG. 1, a schematic of a vehicle 28 having a plurality of sensors for providing sensor signals indicative of the operational status of monitored vehicle components to diagnostics module 22 of hands-free phone system 10 in accordance with an embodiment of the present invention is shown. The sensors of vehicle 28 shown in FIG. 2 are collectively represented as "sensors 24" in FIG. 1 and the remaining FIGS. In vehicle 28, sensor 30 is a crash sensor having an accelerometer; sensor 31 is a coolant thermometer; sensor 32 is an oil pressure sensor; sensor 33 is an oil level sensor; sensor 34 is an air flow meter; sensor 35 is a voltmeter; sensor 36 is an ammeter; sensor 37 is a humidity sensor; sensor 38 is an engine knock sensor; sensor 39 is an oil turbidity sensor; sensor 40 is a throttle position sensor; sensor 41 is a steering torque sensor; sensor 42 is a wheel speed sensor; sensor 43 is a tachometer; sensor 44 is a speedometer; sensor 45 is an oxygen sensor; sensor 46 is a pitch/roll sensor; sensor 47 is a clock; sensor 48 is an odometer; sensor 49 is a power steering pressure sensor; sensor 50 is a pollution sensor; sensor 51 is a fuel gauge; sensor 52 is a cabin thermometer; sensor 53 is a transmission fluid level sensor; sensor 54 is a yaw sensor; sensor 55 is a coolant level sensor; sensor 56 is a transmission fluid turbidity sensor; sensor 57 is brake pressure sensor; sensor 58 is a coolant pressure sensor; and sensor 59 is a microphone. Other possible sensors include a temperature transducer, a pressure transducer, a liquid level sensor, a flow meter, a position sensor, a velocity sensor, a RPM sensor, a chemical sensor and an angle sensor, angular rate sensor or gyroscope.

Referring now to FIG. 3, with continual reference to FIGS. 1 and 2, a block diagram of a system 60 for communicating diagnostic data of a vehicle from hands-free phone system 10 to an Internet server 26 via a Bluetooth enabled cell phone 14 in the vehicle for subsequent retrieval of the diagnostic data from the Internet server by a vehicle service provider and/or a user of the vehicle in accordance with an embodiment of the present invention is shown. System 60 generally encompasses sensors 24, vehicle bus 18, hands-free phone system 10, and cell phone 14. The general operation of system 60 is as follows. Information (i.e., sensor signals) from sensors 24 passes onto vehicle bus 18 to diagnostics module 22 of phone system 10. Alternatively, the sensor signals may pass from sensors 24 to diagnostics module 22 via vehicle bus 18, a wireless communications system, a wire harness, or a combination thereof. Diagnostics module 22 provides diagnostic data based on the sensor signals to communications module 12 of phone system 10. Diagnostics module 22 may analyze the sensor signals and/or maintain the sensor signals in their raw state to produce the diagnostic data. Communications module 12 wirelessly transmits the diagnostic data over a Bluetooth wireless connection to Bluetooth enabled cell phone 14. Cell phone 14 communicates the diagnostic data over a communications path 24 having at least one wireless segment for receipt by an Internet server 26. A vehicle service provider such as a vehicle dealer 62 may access the diagnostic data from Internet server 26 using an Internet connection and then notify a user 64 of the vehicle if the diagnostic data indicates that a vehicle component is in need of maintenance or repair. Dealer 62 may access and analyze the diagnostic data on Internet server 26 either manually through the use of service personnel or automatically through the use of a computer program. Likewise, user 64 may access the diagnostic data from Internet server 26 using an Internet connection to monitor the condition of the vehicle.

Dealer 62 and/or user 64 may use the diagnostic data to determine potential vehicle component failures. A list of examples of potential vehicle component failures and the sensor signals making up the diagnostic data relative to these vehicle components is as follows:

out of balance tires: sensors 30, 41, 42, 43, 48, 49;
front end out of alignment: sensors 30, 41, 49, 54;
tune up required: sensors 30, 31, 38, 40, 43, 45, 48, 50;

oil change needed: sensors 31, 32, 33, 39;
motor failure: sensors 30, 31, 32, 33, 34, 38, 40, 43, 45, 50, 59;
low tire pressure: sensors 30, 41, 42, 43, 48, 49;
front end looseness: sensors 30, 41, 44, 49, 54;
cooling system failure: sensors 31, 43, 52, 55, 58;
alternator problems: sensors 30, 35, 36, 43, 47, 48, 59;
transmission problems: sensors 30, 31, 40, 43, 44, 48, 53, 56;
differential problems: sensors 30, 40, 42;
brakes: sensors 30, 42, 46, 48, 54, 57, 59;
catalytic converter and muffler: sensors 30, 40, 43, 50, 59;
ignition: sensors 30, 35, 36, 37, 38, 40, 45, 51, 59;
tire wear: sensors 30, 41, 42, 43, 46, 48, 49, 54;
fuel leakage: sensors 48, 51;
fan belt slippage: sensors 30, 31, 35, 36, 40, 43, 47, 48, 59;
alternator deterioration: sensors 30, 35, 36, 43, 47, 59;
coolant pump failure: sensors 30, 31, 52, 55, 58, 59;
coolant hose failure: sensors 30, 31, 55, 58, 59;
starter failure: sensors 30, 35, 36, 37, 40, 43, 59; and
dirty air filter: sensors 31, 34, 39, 40, 45, 50, 59.

Again, dealer 62 may contact user 64 upon spotting from the diagnostic data a potential or current failure of a vehicle component to advise the user of the situation so that it may be remedied. Likewise, user 64 may take the vehicle to dealer 64 for service upon the user spotting from the diagnostic data a potential or current failure of a vehicle component.

Referring now to FIG. 4, with continual reference to FIGS. 1, 2, and 3, a more detailed block diagram of system 60 is shown. In operation, diagnostics module 22 of hands-free phone system 10 in the vehicle receives diagnostic data (DD) from sensors 24 in the vehicle. Communications module 12 wirelessly transmits the diagnostic data over a Bluetooth wireless path 62 to Bluetooth enabled cell phone 14. Cell phone 14 communicates the diagnostic data over anyone of two paths 66, 68. First path 66 is a direct wireless path between cell phone 14 and the Internet 64 and employs General Packet Radio Service (GPRS) communications. In this case, the diagnostic data is transmitted directly from cell phone 14 to the Internet 64. Second path 68 is a wireless path from cell phone 14 to a cell phone network 70 and employs GSM, CDMA, TDMA, etc., communications. For instance, second path 68 is a wireless path from cell phone 14 to a communications tower of cell phone network 70. Cell phone network 70 transfers the diagnostic data received from cell phone 14 to an Internet Service Provider (ISP) 72 over a telephone line 74 or the like. ISP 72 then transfers the diagnostic data over a communications line 76 to the Internet 64. Communications line 76 may be a DSL, T1, cable, etc., communications line.

As such, diagnostic data of the vehicle is transferred from phone system 10 to cell phone 14 and then from the cell phone to the Internet 64. The diagnostic data is then transferred through the Internet over a communications line 78 to Internet server 26 for storage therein. Communications line 78 may be a DSL, T1, cable, etc., communications line. At this point, the diagnostic data is stored in Internet server 26 and is available to anyone having access to the Internet server. Vehicle dealer 62 includes a personal computer or the like which is connected to the Internet 64 by a communications line 80. Communications line 80 may be a DSL, T1, cable, etc., communications line. Vehicle dealer 62 accesses Internet server 26 via the Internet 64 using communications line 80 to download the diagnostic data stored in the Internet server. Vehicle dealer 62 may then analyze the diagnostic data to determine if any of the vehicle components are in need of repair or maintenance and then notify vehicle user 64 of same. Vehicle dealer 62 may notify the user using e-mail by communicating with a personal computer of vehicle user 64. The personal computer of vehicle user 64 is likewise connected to the Internet 64 via a communications line 82. Communications line 82 may be a DSL, T1, cable, etc., communications line. As such, vehicle user 64 may access Internet server 26 via the Internet 64 using communications line 82 to download the diagnostic data to determine if any of the vehicle components are in need of repair or maintenance.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A vehicle comprising:
a vehicle bus;
a plurality of sensors for monitoring the operational status or condition of components of the vehicle, each sensor generating a sensor signal indicative of the monitored vehicle component and providing the sensor signal to the vehicle bus;
a diagnostics module connected to the vehicle bus to receive the sensor signals, wherein the diagnostics module generates diagnostic data of the vehicle based on the sensor signals; and
a hands-free phone system having a communications module connected to the vehicle bus and operable for wirelessly communicating voice signals and the diagnostic data over a Bluetooth wireless path with a Bluetooth enabled cell phone in the vehicle using Bluetooth communications;
wherein during a call between a user using the cell phone and another party over a phone network, the communications module receives voice signals of the user via a microphone connected to the communications module and wirelessly transmits the voice signals of the user over the wireless path to the cell phone for transmission over the phone network for receipt by the other party and the communications module wirelessly receives voice signals of the other party over the wireless path from the cell phone and outputs the voice signals of the other party through speakers connected to the communications module for the user to hear;
wherein the diagnostics module transfers the diagnostic data to the communications module and the communications module wirelessly transmits the diagnostic data over the Bluetooth wireless path to the cell phone using Bluetooth communications for the cell phone to communicate the diagnostic data to an external destination.

2. The system of claim 1 wherein:
the diagnostics module transfers the diagnostic data to the communications module over the vehicle bus.

3. The system of claim 1 wherein:
the diagnostic data includes the sensor signals.

4. The system of claim 1 wherein:
the diagnostic data includes an identifier of the vehicle.

5. A system for communicating diagnostic data of a vehicle from the vehicle to a vehicle service provider, the system comprising:
a plurality of sensors for monitoring the operational status or condition of components of the vehicle, each sensor generating a sensor signal indicative of the monitored vehicle component;

a diagnostics module operable for receiving the sensor signals from the sensors, wherein the diagnostics module generates diagnostic data based on the sensor signals;

a Bluetooth enabled cell phone in the vehicle;

a hands-free phone system in the vehicle, the hands-free phone system having a communications module operable for wirelessly communicating voice signals and the diagnostic data over a Bluetooth wireless path with the cell phone using Bluetooth communications; and a computer of a vehicle service provider having access to an Internet server via the Internet;

wherein during a call between a user using the cell phone and another party over a phone network, the communications module receives voice signals of the user via a microphone connected to the communications module and wirelessly transmits the voice signals of the user over the wireless path to the cell phone for transmission over the phone network for receipt by the other party and the communications module wirelessly receives voice signals of the other party over the wireless path from the cell phone and outputs the voice signals of the other party through speakers connected to the communications module for the user to hear;

wherein the diagnostics module transfers the diagnostic data to the communications module, wherein the communications module wirelessly transmits the diagnostic data over the Bluetooth wireless path to the cell phone using Bluetooth communications, wherein the cell phone communicates the diagnostic data to the Internet server via the Internet.

6. The system of claim 5 wherein:
the diagnostics module receives the sensor signals from the sensors over a vehicle bus.

7. The system of claim 5 wherein:
the diagnostics module transfers the diagnostic data to the communications module over a vehicle bus.

8. The system of claim 5 wherein:
the diagnostic data includes the sensor signals.

9. The system of claim 5 wherein:
the diagnostic data includes an identifier of the vehicle.

10. The system of claim 5 wherein:
the cell phone communicates the diagnostic data to the Internet server via a General Packet Radio Service (GPRS) communications line connected to the Internet.

11. The system of claim 5 wherein:
the cell phone communicates the diagnostic data to the Internet server via a cell phone telecommunications network connected to the Internet.

12. The system of claim 11 wherein:
the cell phone telecommunications network is connected to the Internet via an Internet service provider.

13. The system of claim 5 further comprising:
a computer of a user of the vehicle;
wherein the computer of the vehicle service provider has access to the computer of the vehicle user via the Internet, wherein the vehicle service provider transfers a notification regarding a vehicle component in need of repair of maintenance to the computer of the vehicle user via the computer of the vehicle service provider.

14. The system of claim 5 further comprising:
a computer of a user of the vehicle;
wherein the computer of the vehicle user accesses the diagnostic data stored on the Internet server for the vehicle user to analyze the diagnostic data to determine if any of the vehicle components are in need of repair or maintenance.

15. A method for communicating diagnostic data of a vehicle to a vehicle service provider, the method comprising:
monitoring components of a vehicle using sensors;
generating sensor signals indicative of the monitored vehicle components;
generating diagnostic data based on the sensor signals;
providing in the vehicle a hands-free phone system operable for wirelessly communicating voice signals and the diagnostic data over a Bluetooth wireless path with a Bluetooth enabled cell phone in the vehicle using Bluetooth communications;
during a call between a user using the cell phone and another party over a network, receiving by the phone system voice signals of the user via a microphone connected to the phone system and wirelessly transmitting from the phone system the voice signals of the user over the wireless path to the cell phone for transmission over the network for receipt by the other party and wirelessly receiving by the phone system voice signals of the other party over the wireless path from the cell phone and outputting from the phone system the voice signals of the other party through speakers connected to the phone system for the user to hear;
transferring the diagnostic data to the hands-free phone system of the vehicle;
wirelessly communicating the diagnostic data from the hands-free phone system over the Bluetooth wireless path to the Bluetooth enabled cell phone in the vehicle using Bluetooth communications;
communicating over a communications line having at least one wireless segment the diagnostic data from the cell phone to an Internet server via the Internet.

16. The method of claim 15 further comprising:
receiving the sensor signals from the sensors over a vehicle bus prior to generating diagnostic data based on the sensor signals.

17. The method of claim 15 wherein:
transferring the diagnostic data to a hands-free phone system includes transferring the diagnostic data over a vehicle bus to the hands-free phone system.

18. The method of claim 15 wherein:
communicating over a communications line having at least one wireless segment the diagnostic data from the cell phone to an Internet server via the Internet includes communicating the diagnostic data to the Internet server via a General Packet Radio Service (GPRS) communications line connected to the Internet.

19. The method of claim 15 wherein:
communicating over a communications line having at least one wireless segment the diagnostic data from the cell phone to an Internet server via the Internet includes communicating the diagnostic data to the Internet server via a cell phone telecommunications network connected to the Internet.

20. The method of claim 15 further comprising:
accessing the diagnostic data from the Internet server using a computer of a user of the vehicle.

* * * * *